United States Patent [19]

Sato

[11] Patent Number: 5,506,306
[45] Date of Patent: Apr. 9, 1996

[54] ESTER POLYMER COMPATIBILIZERS

[75] Inventor: Kyosaku Sato, Calgary, Canada

[73] Assignee: Novacor Chemicals Ltd., Calgary, Canada

[21] Appl. No.: 336,808

[22] Filed: Nov. 9, 1994

[30] Foreign Application Priority Data

Nov. 12, 1993 [CA] Canada ................................. 2102985

[51] Int. Cl.$^6$ ............................ C08L 23/20; C08L 23/08; C08L 25/06; C08L 33/08
[52] U.S. Cl. ........................ 525/227; 525/240; 524/523
[58] Field of Search ............................................... 525/227

[56] References Cited

U.S. PATENT DOCUMENTS

| | | | |
|---|---|---|---|
| 4,374,882 | 2/1983 | Harlan | 525/227 |
| 4,386,186 | 5/1983 | Maresca et al. | 525/68 |
| 4,386,187 | 5/1983 | Grancio et al. | 525/96 |
| 4,579,912 | 4/1986 | Canterino et al. | 525/240 |
| 4,760,116 | 7/1988 | Roberts | 525/227 |
| 4,929,681 | 5/1990 | Bahl et al. | 525/240 |
| 5,281,651 | 1/1994 | Ayunan et al. | 525/221 |
| 5,326,602 | 7/1994 | Rifi | 525/227 |

FOREIGN PATENT DOCUMENTS

| | | | |
|---|---|---|---|
| 1104741 | 7/1981 | Canada | 400/91 |
| 2356694 | 1/1978 | France | C08L 25/06 |

*Primary Examiner*—Carman J. Seccuro, Jr.

[57] ABSTRACT

Polyethylene has a number of desirable properties. However, for some thin film applications it is desirable to increase the stiffness of the film. This may be accomplished by incorporating a polymer of a vinyl aromatic monomer into the alloy. Such two-component blends have a low impact and low tear resistance. These deficient properties of the alloy may be significantly increased, without any significant loss of stiffness by further incorporating into the alloy a polymer based on a copolymer of ethylene and an alkyl ester of an ethylenically unsaturated carboxylic acid.

16 Claims, No Drawings

ESTER POLYMER COMPATIBILIZERS

FIELD OF THE INVENTION

The present invention relates to polymer alloys. More particularly the present invention relates of alloys of alpha olefins, a rigid polymer and a polymer which is believed to compatibilize the first two components. The polymer alloys of the present invention are useful to provide tough and stiff thin gauge films which are useful in bags.

BACKGROUND OF THE INVENTION

One of the trends in the packaging industry is towards down-gauging or reducing the gauge of plastic film used in household film applications such as trash bags. While this reduces the waste going into landfills, it results in several annoyances to the consumer.

Thinner bags have a lower strength (impact, tear, puncture, and tensile). Additionally, thinner bags may lack stiffness which permits the bag to be opened easily. Accordingly, it would be desirable to have bags with improved stiffness without a significant loss of strength (such as impact, tear, tensile, and puncture resistance).

Accordingly, there is a need for a polymer alloy suitable for use in thin gauge films having good stiffness without a loss in strength such as impact, puncture and/or tear resistance.

There have been a number of approaches to try to overcome the drawbacks noted above. Generally, the approach has been to blend a polyolefin with a stiffer rigid polymer, typically a styrenic polymer. Unfortunately, most of these rigid polymers are not compatible with polyolefins. Accordingly, a small amount of compatibilizer is added to the blend. Desirably the compatibilizer would be a polymer having a styrenic component and an olefin or at least an aliphatic component. Given this desiderata, the first approach was to blend styrene butadiene styrene block polymers (SBS) or hydrogenated styrene butadiene styrene (also called styrene-ethylene-butene or butylene-styrene (SEBS)) copolymers into the alloy. This approach is illustrated by a number of patents including U.S. Pat. Nos. 4,386,186 and 4,386,187, issued May 31, 1983, assigned to Sweetheart Plastic Inc.; Canadian Patent 1,104,741, issued Jul. 7, 1981, assigned to The General Electric Company; and French Patent No. 2,356,694, published Jan. 27, 1978 in the name of Siamp-Cedap Reunies.

Applicant has conducted a number of patent searches and has been unable to locate any art relating to alloys of the present invention and particularly alloys containing a $C_{4-8}$ polyolefin in conjunction with a copolymer of ethylene and a $C_{1-4}$ alkyl ester of a $C_{3-6}$ ethylenically unsaturated carboxylic acid and a rigid polymer.

SUMMARY OF THE INVENTION

Accordingly, the present invention provides a polymer alloy comprising:
(i) from 99 to 85 weight % of a low density olefin polymer comprising:
  (a) from 96 to 93 weight % of ethylene; and
  (b) from 7 to 4 weight % of a copolymerizable $C_{4-8}$ olefin;
(ii) from 0.5 to 10 weight % of one or more polymers selected from the group consisting of:
  (a) homopolymers comprising one or more $C_{8-12}$ vinyl aromatic monomers which are unsubstituted or substituted by a $C_{1-4}$ alkyl radical; and
(iii) from 0.5 to 5 weight % of one or more polymers comprising:
  (a) from 95 to 65 weight % of ethylene; and
  (b) from 5 to 35 weight % of a $C_{1-4}$ alkyl ester of a $C_{3-6}$ ethylenically unsaturated carboxylic acid.

DETAILED DESCRIPTION

The alloys of the present invention comprise from 99 to 85, preferably from 98.5 to 89, most preferably from 97.5 to 94 weight % of a polymer comprising from 93 to 96 weight % of ethylene and from 7 to 4 weight % of a $C_{4-8}$ copolymerizable olefin monomer such as 1-butene, hexene and octene. Preferably, the polymer will be linear low density polyethylene with a density of less than 0.940 g/cm$^3$, preferably less than 0.930 g/cm$^3$.

Suitable polyethylenes may be made by well known processes such as gas phase polymerization in the presence of a supported catalyst comprising a transition metal complex, such as a titanium halide and an activator or co-catalyst such as an alkyl aluminum halide.

The second component in the alloys of the present invention is a polymer containing a vinyl aromatic monomer. The second component is present in an amount from 0.5 to 10, preferably from 1 to 8, most preferably 2 to 5 weight %.

The polymer containing a vinyl aromatic monomer may be a homopolymer.

The vinyl aromatic containing polymer may be a homopolymer of one or more $C_{8-12}$ vinyl aromatic monomers which are unsubstituted or substituted by a $C_{1-4}$ alkyl radical. Suitable monomers include styrene, alpha methylstyrene and p-methyl styrene. A particularly useful monomer is styrene and the resulting polymer is crystal polystyrene.

The polymer used as the second component in the compositions of the present invention may be totally virgin material or it may be recycle material or it may be a blend of both virgin and recycle. If a blend of virgin and recycle material is used it may comprise a weight ratio of virgin to recycle material from 25:75 to 75:25.

The third component in the alloy of the present invention is present in an amount from 0.3 to 5, preferably 0.5 to 3, most preferably 0.5 to 1 weight %. The third polymer may be a polymer comprising:
  (a) from 95 to 65, preferably from 95 to 70 weight % of ethylene; and
  (b) from 5 to 35, preferably from 5 to 30 weight % of a $C_{1-4}$ alkyl ester of a $C_{3-6}$ ethylenically unsaturated carboxylic acid.

Suitable esters include methyl methacrylate, ethyl methacrylate, methyl acrylate, ethyl acrylate and butyl acrylate. Methyl acrylate and ethyl acrylate are preferred esters. These ester polymers may be prepared by a high pressure polymerization process.

The polymer alloys of the present invention may be prepared by several methods. Generally, solvent blending will not be practical for gas phase produced polyethylene but it may be suitable for solution produced polyethylene as there are a limited number of common or miscible solvents for the different polymeric components used in the alloy.

Typically, the polymer alloy will be prepared by melt blending. There are several methods which could be used to produce the polymer alloys of the present invention. All of the polymeric components are dry blended in the required weight ratio in a suitable device such as a tumble blender. The resulting dry blend is then melted in suitable equipment such as an extruder. The non-polyethylene components could be formed into a master batch which is then fed to an extruder and melt blended. In a third method the dry components of the blend may be metered directly into an extruder.

The extruder may be a twin or single screw extruder. If it is a twin screw extruder, it may be operated in a co-rotating mode (i.e. both screws turning in the same direction) or in a counter rotating mode (i.e. the screws rotate in opposite directions).

The specific conditions for operation of any extruder will differ from that of any other extruder. The variations between machines may usually be resolved by non-inventive testing. Typically, laboratory twin screw extruders will operate within the following envelope of conditions. The barrel will be heated to a temperature from about 180° to 210°, preferably from 190° to 200° C. The screw speed will be from 120 to 150, preferably from 120 to 130 RPM's. The back pressure on the extruder will be from about 1000 to 1300, preferably from 1100 to 1250 psi. As noted above the specific conditions for the operation of any specific extruder can readily be determined by one skilled in the art by non-inventive testing in view of the above envelop of conditions.

The extruder will typically extrude the polymer alloy as strands which are then cooled and cut into pellets for subsequent use, typically film extrusion. From a practical point of view, it is best to try to use polymers having similar or comparable melt index under the conditions of melt blending to obtain a uniform blend.

The film extruder may also be a single or twin screw extruder. The die may be a slot die or it may be an annular ring die extruding a film of the polymer alloy about a stable bubble of air. The film is collapsed after passing over or about the bubble. For laboratory scale film extrusion, the extruder may be operated within the envelop of parameters as set forth in the examples.

The present invention has been discussed in terms of a polymer alloy. It should be kept in mind that the alloy may contain typical amounts of antioxidants, heat and light stabilizers, fillers, opacifying agents and colorants. Generally, the total of the antioxidants, and heat and light stabilizers is less than about 1, preferably less than 0.5, most preferably from 0.01 to 0.1 weight %. The opacifying agents, fillers and colorants, if used, may be present in significantly larger amounts.

The present invention will now be illustrated by the following non-limiting examples in which, unless otherwise specified, parts means parts by weight (i.e. grams) and % means weight %.

Sample Preparation

A series of blends were prepared. In the blends, the base polyethylene polymer was linear low density polyethylene (LLDPE) having a density of 0.918 g/cm$^3$. The polymer of the vinyl aromatic monomer was crystal polystyrene sold under the trade mark NOVACOR 101. The first compatibilizer was a copolymer comprising about 80 weight % of ethylene and the balance methyl acrylate sold under the trade name EMAC SP2205. The second compatibilizer was a copolymer comprising a major proportion of ethylene and the balance ethyl acrylate sold under the trade mark EEA. The third compatibilizer was a copolymer comprising a major amount of ethylene and the balance butyl acrylate sold under the trade mark EBAC.

The components of the first blend using EMAC and EEA as compatibilizers were dry blended in the weight ratio set out below.

| LLDPE | 96 |
| Crystal Polystyrene | 3 |
| Compatibilizer | 1 |
| Antioxidant | 0.1 |

The control was a blend of 96 parts of the same LLDPE, 3 parts of the same crystal polystyrene and 0.1 parts of the same antioxidant.

The components of the second blend using EMAC, EEA, and EBAC were dry blended in the weight ration set out below.

| LLDPE | 95 |
| Crystal Polystyrene | 5 |
| Compatibilizer | 1 |
| Antioxidant | 0.1 |

The control was a blend of 95 parts of the same LLDPE, 5 parts of the same crystal polystyrene and 0.1 parts of the same antioxidant.

The samples were tumble blended and passed through a LEISTRITZ® twin screw extruder, having 8 heated zones in the barrel, heated at temperatures from 180° to 200° C., at screw speeds of 130 RPM's, and at initial melt pressures of about 1200 psi.

The polymer alloy was extruded as strands which were cooled and chopped into pellets.

EXAMPLE 1

Pellets of the first blend were then fed to a blown film extruder. The extruder had a 3 inch die diameter with a die gap of 100 mils. The final film thickness was 1 mil. The barrel temperatures in the extruder ranged from 180° to 215° C. The melt pressure ranged from 1750 to 1820 PSI and the screw speed ranged from 90.7 to 98. The temperature of the melt as it exited the die was about 210° C.

The extruded blown film was measured for its physical properties. The results are set forth in Table 1.

TABLE 1

| Sample | Control | EMAC Compatibilizer | EEA Compatibilizer |
|---|---|---|---|
| MD 1% Secant Modulus (MPa) | 225 | 234 | 255 |
| Dart Impact (g/mil) | 192 | 216 | 202 |
| MD Elmendorf Tear (g/mil) | 263 | 281 | 243 |

Note MD means in the Machine Direction

EXAMPLE 2

Pellets of the second blend were then fed to a blown film extruder. The extruder had a 3 inch die diameter with a die gap of 35 mils. The final film thickness was 0.5 mil. The barrel temperatures in the extruder ranged from 180° to 215° C. The melt pressure ranged from 1750 to 1820 PSI and the screw speed ranged from 90.7 to 98. The temperature of the melt as it exited the die was about 210° C.

The extruded blown film was measured for its physical properties, The results are set forth in Table 2.

TABLE 2

| Sample | Control | EMAC Compatibilizer | EEA Compatibilizer | EBAC Compatibilizer |
| --- | --- | --- | --- | --- |
| MD 1% Secant Modulus (MPa) | 237 | 301 | 244 | 264 |
| Dart Impact (g/mil) | 177 | 204 | 220 | 160 |
| MD Elemendorf Tear (g/mil) | 84 | 127 | 120 | 133 |

Note MD means in the Machine Direction

Tables 1 and 2 shows that the blends of the present invention have an overall good balance of properties and that depending on the application the alloy may be selected to maximize either dart impact or Elmendorf tear strength.

What is claimed is:

1. A polymer alloy comprising:
   (i) from 99 to 85 weight % of a low density olefin polymer comprising:
      (a) from 96 to 93 weight % of ethylene; and
      (b) from 7 to 4 weight % of a copolymerizable $C_{4-8}$ olefin;
   (ii) from 0.5 to 10 weight % of one or more polymers selected from the group consisting of:
      (a) homopolymers comprising one or more $C_{8-12}$ vinyl aromatic monomers which are unsubstituted or substituted by a $C_{1-4}$ alkyl radical; and
   (iii) from 0.3 to 5 weight % of one or more polymers comprising:
      (a) from 95 to 65 weight % of ethylene; and
      (b) from 5 to 35 weight % of a $C_{1-4}$ alkyl ester of a $C_{3-6}$ ethylenically unsaturated carboxylic acid.

2. The polymer alloy according to claim 1, wherein component (i) is linear low density polyethylene and is present in an amount from 98.0 to 89 weight %.

3. The polymer alloy according to claim 2, wherein component (i) has a density less than 0.940 g/cm$^3$.

4. The polymer alloy according to claim 3, wherein component (ii) is present in an amount from 1 to 8 weight %.

5. The polymer alloy according to claim 4, wherein in component (ii) said $C_{8-12}$ vinyl aromatic monomer is selected from the group consisting of styrene, alpha methyl styrene, and p-methyl styrene.

6. The polymer alloy according to claim 5, wherein component (iii) is present in an amount from 0.5 to 3 weight %.

7. The polymer alloy according to claim 6, wherein component (ii) is polystyrene.

8. The polymer alloy according to claim 7, wherein component (iii) comprises:
   (a) from 95 to 70 weight % of ethylene; and
   (b) from 5 to 30 weight % of one or more monomers selected from the group consisting of methyl methacrylate, ethyl methacrylate, methyl acrylate, ethyl acrylate and butyl acrylate.

9. The polymer alloy according to claim 8, wherein component (iii) is present in an amount from 0.5 to 1 weight %.

10. The polymer alloy according to claim 9, wherein component (iii)(b) is methyl acrylate.

11. The polymer alloy according to claim 9, wherein component (iii)(b) is ethyl acrylate.

12. The polymer alloy according to claim 9, wherein component (iii)(b) is butyl acrylate.

13. The polymer alloy according to claim 3, wherein component (i) has a density of less than 0.930 g/cm$^3$.

14. The polymer alloy according to claim 10, wherein component (ii) is present in an amount from 1 to 8 weight %.

15. The polymer alloy according to claim 11, wherein component (ii) is present in an amount from 1 to 8 weight %.

16. The polymer alloy according to claim 12, wherein component (ii) is present in an amount from 1 to 8 weight %.

* * * * *